United States Patent [19]

Bernstein

[11] Patent Number: 4,555,774
[45] Date of Patent: Nov. 26, 1985

[54] FAST RESPONSE FOR SWITCHED DATA NETWORKS

[75] Inventor: Lawrence Bernstein, Short Hills, N.J.
[73] Assignee: AT&T Bell Laboratories, Murray Hill, N.J.
[21] Appl. No.: 409,645
[22] Filed: Aug. 19, 1982
[51] Int. Cl.$^4$ .............................................. G06F 3/00
[52] U.S. Cl. ................................ 364/900; 340/825.55
[58] Field of Search ... 364/200 MS File, 900 MS File, 364/518, 514; 340/825.54, 825.55, 825.27, 825.28, 825.29, 706, 711, 712; 370/94, 82, 84, 85, 86, 87, 79, 91

[56] References Cited

U.S. PATENT DOCUMENTS

| | | | |
|---|---|---|---|
| Re. 31,182 | 3/1983 | Crager et al. | 370/94 |
| 3,566,090 | 2/1971 | Johnson | 340/825.27 |
| 3,899,772 | 8/1975 | Mead et al. | 340/825.55 |
| 4,034,339 | 7/1977 | Free et al. | 340/825.55 |
| 4,064,561 | 12/1977 | Jennings | 364/900 |
| 4,121,283 | 10/1978 | Walker | 364/200 |
| 4,319,336 | 3/1982 | Anderson et al. | 364/200 |
| 4,375,079 | 2/1983 | Ricketts et al. | 364/518 |
| 4,445,213 | 4/1984 | Baugh et al. | 370/79 X |

OTHER PUBLICATIONS

"Survey of Computer Communications Loop Networks: Part 1"; by B. K. Penney et al.; Computer Communications, vol. 2, No. 4, Aug. 1979.

Primary Examiner—James D. Thomas
Assistant Examiner—William G. Niessen
Attorney, Agent, or Firm—Robert O. Nimtz

[57] ABSTRACT

An interactive information retrieval system is disclosed in which a large number of user terminals interact bilaterally with a centralized computer controlled data base by using a communications controller. In order to speed up the response time of the system, long messages from the controller to the terminal are broken into two segments, one segment just sufficiently long to engage the attention of the user while the balance of the message is being transmitted and verified. The balance of the long message is contained in a second segment. This process and apparatus may be implemented by hard-wired circuitry or by a programmed computer.

9 Claims, 5 Drawing Figures

FAST RESPONSE FOR SWITCHED DATA NETWORKS

TECHNICAL FIELD

This invention relates to data communications systems and, more particularly, to optimizing the transmission of long messages to a plurality of terminals sharing common transmission facilities.

BACKGROUND OF THE INVENTION

Digital data transmission systems are well-known in which large numbers of individual users are connected by shared transmission facilities to a centralized information processing facility. It is common in such systems to communicate between terminals and the central processor by using messages having header portions with address information and data portions of variable length. Moreover, in modern systems, terminals normally have cathode ray display tubes on which the data portion of the message is displayed in order to be read by the user.

Many messages include very long data portions to be displayed, exceeding the capacity of a single screen on the cathode ray tube. In accordance with standard message protocol, such messages include check characters which allow the receiving terminal to ascertain if the message is error-free. If an error has occurred, a request message is sent to have the erroneous message retransmitted. It is only after an error-free message is received and stored locally in the user's terminal that the message is displayed on the CRT screen.

One major problem in multiuser systems such as that described above is the slow response time of the system. Competition for access to the data base and competition for the shared transmission facilities account for some of the delayed response. These contributions can be minimized by good system design which provides adequate capacity in the shared facilities. One source of delayed response time which is, at least in part, determined by user options is the time required to insure the reception of a complete error-free multiscreen message. The delay involved in waiting for the complete message and insuring that no errors have occurred can assume a significant proportion of the total response time and, indeed, in some systems can dominate the response time.

Such long messages can, of course, be broken down into smaller units and thereby speed up the response time. However, a larger number of smaller units increases the overhead time required to process the message segments and may, at least in some cases, increase rather than reduce the total response time.

The problem, then, is to improve the response time for the transmission reception and display if multipage or multiscreen messages from a centralized data processor and transmitted to the ultimate user over shared transmission facilities.

SUMMARY OF THE INVENTION

In accordance with the illustrative embodiment of the present invention, the response time of a digital data processing system is optimized by breaking multiscreen messages into two submessages. The first submessage is just long enough to fill one screen; the second submessage is the balance of the multiscreen message. This arrangement provides the maximum amount of information which can be utilized immediately by the user. Since the user is busily engaged in reading the first screen, the fact that the later screens are delayed are of no subjective consequence.

This arrangement differs from so-called "blocking," where long messages are broken into a plurality of segments, in that blocking segments are all of equal length while the "fast response" segmentation of the present invention provides a first segment of fixed length (equal to the screen capacity) and a second segment of a different variable length (the balance of the message).

Short messages (shorter than one screen capacity) are, of course, transmitted without segmentation. For longer messages, the user has the subjective experience of very fast response even though the second segment may take longer than required by the prior art. The psychology of an empty screen is to heighten subjective feelings of delay; this effect is avoided or minimized.

DETAILED DESCRIPTION

Figure 1:
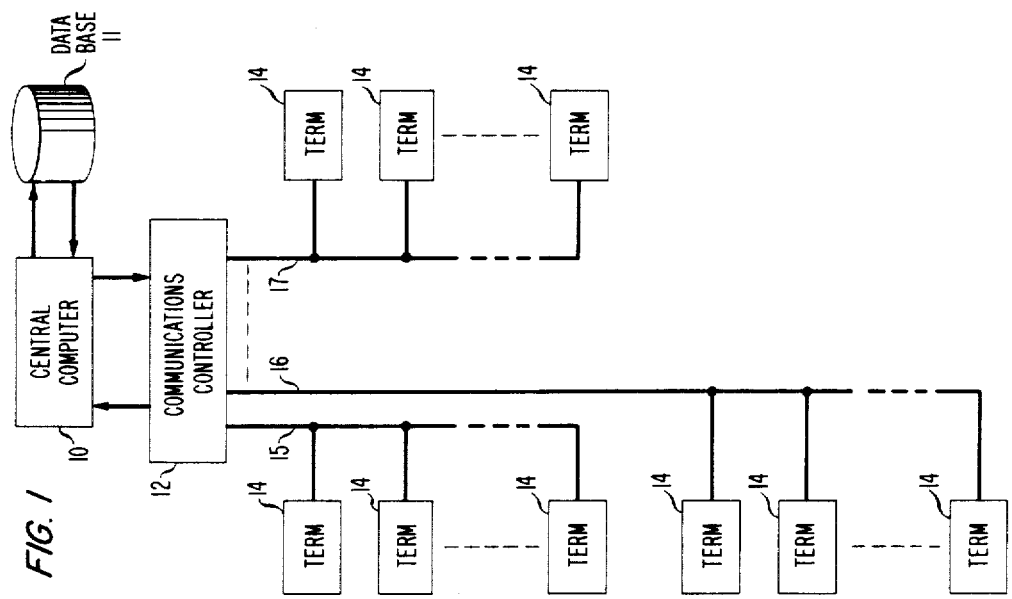
FIG. 1 is a general block diagram of an interactive multiple user computer network system.

In FIG. 1 a central computer 10 is used to access and recover information from a data base 11 illustrated graphically in FIG. 1 as a cylindrical disk drive. The data base 11 may contain any information whatsoever which a large number of users must access and interact with. In one such situation, airline reservations, the data base 11 must keep track of all of the available flights, their sources and destinations, as well as seat reservations on each of those flights. Moreover, users must interact with this data base to make and cancel seat reservations to prevent others from reserving the same seats. Other types of data bases requiring interactive use include searching data bases such as legal or technical publication data bases, inventory data bases, and data bases used to assign resources to a number of different users.

A communications controller 12 is used to interface between central computer 10 and a large number of terminals 14 connected to a plurality of transmission lines 15, 16, . . . 17. Transmission lines 15 through 17 may comprise, for example, standard telephone transmission lines capable of supporting digital transmission at a rate of 4800 bits per second. For other kinds of applications, transmission lines 15 through 17 may be wide band communications media such as coaxial cable or optical fiber lightguide. In any event, the communication lines 15 through 17 are capable of supporting bilateral communications between the communications controller 12 and each of a plurality of remote terminals 14.

The terminals 14, on the other hand, may comprise any interactive terminal capable of initiating messages for transmission to controller 12 and for receiving messages from controller 12. Typically, terminals 14 would each comprise a keyboard for initiating message requests and a cathode ray tube tor displaying response messages. Alternatively, terminals 14 may be hard copy printers such as line printers or teletypewriter machines. In any event, terminals 14 are capable of carrying on interactive transactions with data base 11, primarily by requesting information from data base 11 and receiving that information in response. Terminals 14 are also capable of modifying items in data base 11 by adding, supplementing or correcting entries already in the data base.

Figure 2:
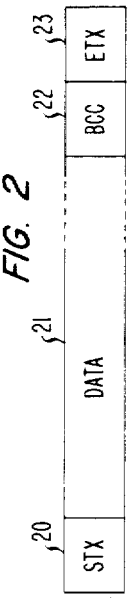
FIG. 2 is a graphical representation of a message block which might be used in a system of FIG. 1.

In FIG. 2 there is shown a graphical representation of a message format that might be exchanged between the terminals 14 and the communications controller 12 of FIG. 1. The message of FIG. 2 comprises a header 20 which is used to start the synchronization for the message. For messages outbound from communications controller 12, the header 20 will also include address information to identify the appropriate one of terminals 14 for which the message is intended.

Immediately following the header 20 is a variable length data portion 21 which includes the text of the message. Following the message data is block check character 22 which is used at the receiving end of the transmission line to check whether the data 21 has been correctly received. The final portion of the message of FIG. 2 is the end of text block 23 which is used to signify the end of the message. If the message of FIG. 2 is not correctly received at the receiving end of the transmission media, the block check character 22 will not agree with similar block check character recalculated as the data block 21 is being received. In that case a new message will be formatted to return to the sending end asking that the message be repeated. Thus the messages in a format of FIG. 2 include error detection redundancy but no error correction capability, and errors can only be corrected by retransmitting the entire message.

In a system such as that shown in FIG. 1, utilizing data messages in a format shown in FIG. 2, a certain amount of delay is encountered between requests for information and display of that information at the user terminal 14. A delay on the order of three to five seconds is usually acceptable for normal usage. This delay, of course, is made up of time required to actually transmit messages on the transmission lines 15, 16 and 17, the time required to access the data base 11, the time required to format the messages for transmission back to the terminal and, in the case of errors in receiving messages, the time necessary to retransmit those messages.

In some interactive information retrieval systems, the messages returned from the data base are of considerable length. They may, for example, constitute the entire contents of a multipage document such as a list of reservations, a legal decision or a technical article. Such long messages cannot be displayed on a single screen of the terminal 14 because of the limited display capacity of such terminal. Such long messages are therefore stored locally in terminal 14 and displayed one page at a time on the cathode ray tube. The first page of the message is not available for display, however, until the entire message is received, the check character verified, and, when required, retransmission requested and received without error. It is therefore possible that, for long messages, the user may find it necessary to wait an exceptionally long period of time before obtaining a response to a request. The psychological effect of staring at an empty screen waiting for a response is to heighten the sense of delay and thus exaggerate the subjective effect of the delay.

Figure 3:
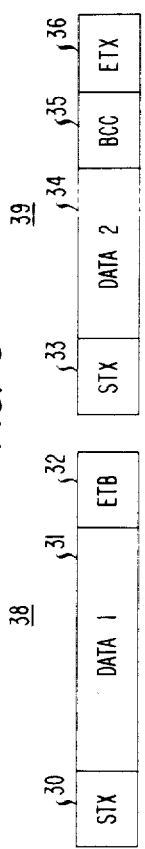
FIG. 3 is a graphical representation of an alternative message block format in accordance with the principles of the present invention.

In accordance with the present invention, the subjective effect of waiting is minimized in an interactive data retrieval system by breaking long messages into two segments, 38 and 39 (FIG. 3). Each of the segments is initiated by a header (30 and 33, respectively) which includes the start of synchronization signals and address information necessary to properly deliver the message. The long data portion 21 of FIG. 2 is broken up into two pieces, segment 31 and segment 34. In message 38, the segment 31 is followed by an end of block signal 32. In message 39, segment 34 is followed by a block check character 35 and an end of text signal 36.

The message 38 includes data segment 31 of just sufficient length to engage the user's attention while the second message 39 is being delivered, verified and possibly retransmitted, if an error has occurred. The data segment 31 may, for example, be just sufficient to fill one screen and thus provide all the information that a user will ever be able to use immediately. More likely, however, data 31 need only be sufficiently long to print a number of lines on the screen which require several seconds for the users to read. During those seconds the balance of the message in message 39 will have been delivered, verified, and displayed on the balance of the screen. That is, the first segment length is just sufficient to engage a user in reading for the average period of time required to transmit, verify and display the second segment.

It will be first noted that the message blocking system of the present invention, unlike prior art message blocking schemes, does not break the message up into equal sized segments. Instead, the large message is broken up into just two message blocks, a first one of fixed size which size is directly related to the ability of the user to absorb the information therein. The second message block, however, is of variable size and, indeed, is the entire balance of the message. This reduces the subjective effect of the empty screen by providing a more or less immediate response to an inquiry, albeit a response very brief in comparison to the total response required for that inquiry.

It will be noted that there is no block check character for the data message 38 in FIG. 3. A block check character 35 serves this function for both data segment 31 and data segment 34. Thus data segment 31 will be displayed immediately upon reception without checking for errors. In a few cases, this may result in an erroneous or nonsense information being printed on the screen. This will appear only until the entire message has been received, including segment 39, and block check character 35 has been checked and retransmission ordered. When the new and correct message is received, the erroneous message on the screen will be replaced by the correct message, albeit after a longer time than would have been required if the original message had remained unblocked. Since the error rate is usually relatively low, this occasional problem is far outweighed by the benefit of having a more or less immediate response on the screen.

In many cases it is also possible to arrange the information in the message so that the most significant information is at the beginning, i.e., in segment 31. In this way, the user, in a significant number of cases, will be able to react to the significant portion of the message and not have to wait until the entire message is received and read. In a text searching system, for example, a title or abstract of a technical article may be sufficient for the user to conclude that he either does not need the full text of the article or that he would prefer the full text of the article in a hard copy format. The user may therefore respond to the first segment by generating a new message requesting new action or new information from the central processing system. This has the effect of significantly increasing the transaction throughput through the system of FIG. 1.

Figure 4:
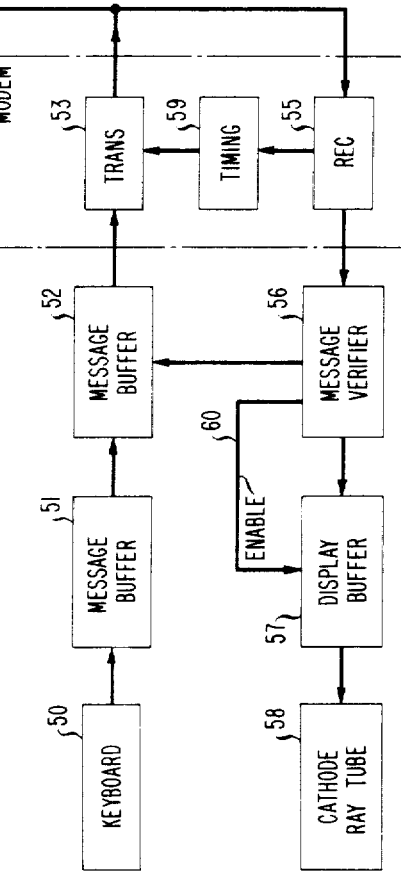
FIG. 4 is a detailed block diagram of one of the terminals shown in FIG. 1.

In FIG. 4 there is shown a detailed block diagram of a typical terminal 14 which might be used in the system of FIG. 1. The terminal 14 may, for example, comprise a keyboard 50 which is used to generate messages using standard typewriter characters. These characters are encoded and stored locally in a message buffer 51 until the entire message has been accumulated. This message is then formatted by message formatter 52 and transmitted by transmitter 53 in modem 54 through transmission line 15 to communications controller 12 of FIG. 1.

Messages from controller 12, also arriving on communications line 15, are received by receiver 55 in modem 54 and passed through a message verifier 56 to a display buffer 57. The contents of display buffer 57 are not displayed on cathode ray tube 58 until message verifier 56 has recalculated the block check character and checks it against the block check character at the end of the received message. If a disparity exists, the message verifier 56, via lead 59 causes message formatter 52 to transmit a retransmit request message. Only after this message is received and verified are the contents of display buffer 57 displayed on cathode ray tube 58, in response to a signal on lead 60.

In accordance with the present invention, the contents of display buffer 57 are displayed on cathode ray tube 58 wnen the end of block message is received, indicated by a signal on lead 60. This immediate display provides the fast response time which is necessary to take advantage of the present invention. A timing circuit 59 derives synchronization timing from received messages in receiver 55 and also generates timing information for transmitted messages from transmitter 53. The details of the terminal ot FIG. 4 are well-known and will not be further described here.

Figure 5:
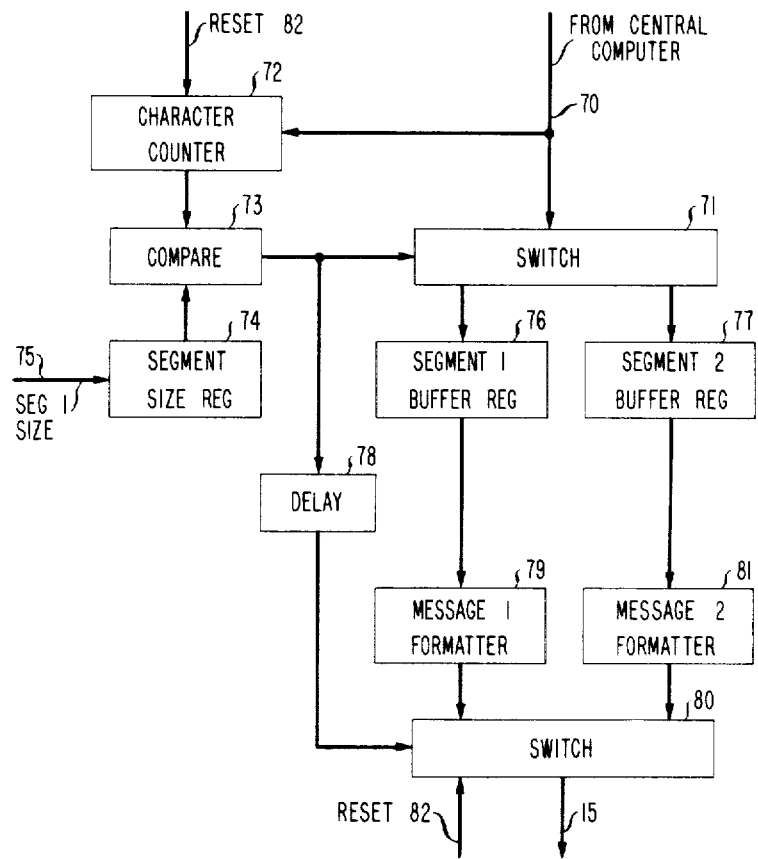
FIG. 5 is a detailed block diagram of a portion of the communications controller shown in FIG. 1.

In FIG. 5 there is shown a detailed block diagram of the portion of the communications controller 12 which is used to break long messages into segments in accordance with the present invention. Messages received from computer 10 by communications controller 12 on transmission line 70 are applied to a switch 71 as well as to a character counter 72. Character counter 72 counts the number of characters received on transmission line 70 and provides this character count to a compare circuit 73. A user controllable segment size is stored in segment size register 74 by way of lead 75. This segment size is, of course, the number of characters the particular user can read in the period required to transmit and display the balance of the message, usually on the order ot a few hundred characters. When the character counter 72 reaches a count equal to the segment size in register 74, compare circuit 73 generates an output signal on lead 82 which operates switch 71 to switch the data stream on line 70 from segment 1 buffer register 76 to segment 2 buffer register 77. The output of compare circuit 73 is also supplied to delay circuit 78.

The contents of segment 1 buffer register 76 is data segment 31 of FIG. 3. The header and end of block characters are added to this data in message 1 formatter 79 and this message is passed through switch 80 to output line 15. The segment 2 buffer register 77 eventually contains the data segment 34 ot FIG. 3. This information is formatted in formatter 81 by adding the header information to block check character and the end of text character and then transmitted through switch 80 to output line 15.

The output of delay circuit 78 is used to control switch 80 to allow the message from message formatter 81 to be transmitted on line 15 following the transmission ot the output of tormatter 79. The delay 78 is just sufficient to allow the formatting of the message before switch 80 is operated. A message start signal on lead 82 from the central computer 10 is used to reset character counter 22, switch 80 and switch 71 in preparation for the reception of the new message.

The communications controller 12 has been illustrated in FIG. 5 as a special purpose wired circuit controller to be duplicated for each of the transmission lines 15 through 17. In actual practice, the communications controller 12 may well itself comprise a programmed computer, in which case the various registers would comprise memory storage space in the internal memory of the computer and the various counters and comparisons would be accomplished under programmed control. It is to be understood that either of these approaches can be used realize the present invention.

What is claimed is:
1. An interactive mechanized request-response information handling system comprising
 a data storage mechanism;
 a data processor for reading, writing, and editing data in said storage mechanism;
 a plurality of remote user terminals for providing information requests to said storage mechanism and for displaying responses to said requests as a plurality of successive display increments wherein each of said display increments includes only so much information as can be displayed at one time at any one of said terminals; and
 a communications controller for formatting information responses from said data storage mechanism into two message blocks, one block of fixed length equal to the contents of a single one of said display increments to provide fast response to an inquiry, and the other block comprising the balance of the information response.

2. The information handling system according to claim 1 including means for delimiting said blocks by delimiting code sequences; and
 means for calculating error detection check characters for said message blocks.

3. The information handling system according to claim 2 further including means for displaying said fixed length block to a user before checking said check characters.

4. The information handling system according to claim 1 wherein said fixed length comprises sufficient characters to fill a screen of a cathode ray tube terminal.

5. The method of providing fast responses to requests for information in a centralized information retrieval system comprising the steps of
 (1) generating response messages in response to each of said requests;
 (2) dividing said response message into two message segments, the first segment being of fixed length including only so much information as can be displayed at one time at a terminal and the second segment comprising the balance of said response message;

(3) transmitting and immediately displaying or printing said first segment prior to the complete reception of said second segment; and (4) displaying or printing said second segment when available and if desired.

6. The fast response method according to claim 5 including the step of (5) selecting said fixed length to be sufficiently long to be read in the length of time required to transmit said second segment.

7. The fast response method according to claim 5 including the step of (5) selecting said fixed length to be the amount of data required to fill one screen of a cathode ray tube.

8. The fast response method according to claim 5 including the steps of (5) adding submessage code delimiters to said message segments; and (6) adding error detection blocks to at least one of said message segments.

9. The fast response method according to claim 8 further including the step of (7) displaying or printing said first segment checking said error detection block.

* * * * *